US012362831B2

(12) United States Patent
Asaka et al.

(10) Patent No.: US 12,362,831 B2
(45) Date of Patent: Jul. 15, 2025

(54) OPTICAL MAIN SIGNAL PROCESSING NODE APPARATUS AND CONTROL METHOD OF OPTICAL MAIN SIGNAL PROCESSING NODE APPARATUS

(71) Applicant: Nippon Telegraph and Telephone Corporation, Tokyo (JP)

(72) Inventors: Kota Asaka, Musashino (JP); Keita Nishimoto, Musashino (JP); Yukio Toyoshima, Musashino (JP); Takashi Yamada, Musashino (JP); Junichi Kani, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 373 days.

(21) Appl. No.: 18/008,523

(22) PCT Filed: Jun. 8, 2020

(86) PCT No.: PCT/JP2020/022581
§ 371 (c)(1),
(2) Date: Dec. 6, 2022

(87) PCT Pub. No.: WO2021/250756
PCT Pub. Date: Dec. 16, 2021

(65) Prior Publication Data
US 2023/0216591 A1   Jul. 6, 2023

(51) Int. Cl.
*H04B 10/291* (2013.01)
*H04B 10/27* (2013.01)

(52) U.S. Cl.
CPC ........... *H04B 10/291* (2013.01); *H04B 10/27* (2013.01)

(58) Field of Classification Search
CPC ............................. H04B 10/27; H04B 10/291
(Continued)

(56) References Cited

U.S. PATENT DOCUMENTS 6,249,510 B1 * 6/2001 Thompson .......... H04J 14/0295
370/227
6,570,685 B1 * 5/2003 Fujita .................. H04J 14/0283
398/79
(Continued)

FOREIGN PATENT DOCUMENTS

JP   2005323185   11/2005
JP   2016225850   12/2016
(Continued)

OTHER PUBLICATIONS

NTT, "NTT DOCOMO Technical Journal," 5G Radio Access Network Standardization Trends, Oct. 2017, 25(3):1-75, 158 pages (with English Translation).
(Continued)

*Primary Examiner* — Dalzid E Singh
(74) *Attorney, Agent, or Firm* — Fish & Richardson P.C.

(57) ABSTRACT

One aspect of the present invention is a optical main signal processing node apparatus including: an input port for inputting an optical multiplexed with signals pertaining to a plurality of services from an optical transmission path; an output port for outputting an optical signal multiplexed with signals pertaining to a plurality of services to an optical transmission path; a optical main signal processer configured to perform optical main signal processing on an optical signal input from the input port; and a path switch configured to switch a path of the optical signal input from the input port to one of a first path for guiding the optical signal to the output port and a second path for guiding the optical signal to the optical main signal processer.

2 Claims, 7 Drawing Sheets

(58) Field of Classification Search
USPC .......................................................... 398/49
See application file for complete search history.

(56) References Cited

U.S. PATENT DOCUMENTS

| | | | | |
|---|---|---|---|---|
| 2002/0101633 A1* | 8/2002 | Onaka | ................. | H04J 14/0289 |
| | | | | 398/59 |
| 2002/0141453 A1* | 10/2002 | Ghani | ................. | H04J 14/0241 |
| | | | | 370/537 |
| 2003/0081283 A1* | 5/2003 | Ishizuka | ............ | H04Q 11/0005 |
| | | | | 398/79 |
| 2003/0138252 A1* | 7/2003 | Paiam | ................. | H04Q 11/0005 |
| | | | | 398/49 |
| 2008/0013950 A1* | 1/2008 | Boudreault | ......... | H04J 14/0216 |
| | | | | 398/59 |
| 2010/0098412 A1* | 4/2010 | Boyd | ................. | H04J 14/0272 |
| | | | | 398/48 |
| 2012/0002964 A1* | 1/2012 | Takatsu | ............... | H04J 14/0212 |
| | | | | 398/83 |
| 2018/0145758 A1* | 5/2018 | Taguchi | ............... | H04B 10/272 |
| 2021/0013971 A1 | 1/2021 | Hara et al. | | |

FOREIGN PATENT DOCUMENTS

| | | |
|---|---|---|
| JP | 2019161575 | 9/2019 |
| WO | WO 2016186176 | 11/2016 |

OTHER PUBLICATIONS

The Telecommunication Technology Committee, "Technical report of optical access technologies applying 5G mobile fronthaul," TR-1079, TTC Technical Report, May 30, 2019, 1.0: 42 pages (No Translation).

* cited by examiner

FIG. 3

| WAVELENGTH | SERVICE | PATH SETTING | MAIN SIGNAL PROCESSING FUNCTION |
|---|---|---|---|
| $\lambda 1$ | PtP DATA COMMUNICATION | THROUGH | NA |
| $\lambda 2$ | MFH1 (Option6) | SWITCH | DU FUNCTION |
| $\lambda 3$ | MFH2 (Option7) | SWITCH | DU FUNCTION |
| $\lambda 4$ | NOT USED | SWITCH | FRAME DISCARDING |

FIG. 6

| WAVELENGTH | SERVICE | PATH SETTING | MAIN SIGNAL PROCESSING FUNCTION |
|---|---|---|---|
| λ1 | PtP DATA COMMUNICATION | THROUGH | NA |
| λ2 | MFH1 (Option6) | SWITCH | DU FUNCTION AGGREGATION |
| λ3 | MFH1 (Option6) | SWITCH | |
| λ4 | NOT USED | SWITCH | FRAME DISCARDING |

OPTICAL MAIN SIGNAL PROCESSING NODE APPARATUS AND CONTROL METHOD OF OPTICAL MAIN SIGNAL PROCESSING NODE APPARATUS

CROSS-REFERENCE TO RELATED APPLICATIONS

This application is a National Stage application under 35 U.S.C. § 371 of International Application No. PCT/JP2020/022581, having an International Filing Date of Jun. 8, 2020.

The disclosure of the prior application is considered part of the disclosure of this application, and is incorporated by reference in its entirety into this application

TECHNICAL FIELD

The present invention relates to a technique of a optical main signal processing node apparatus and a control method of optical main signal processing node apparatus.

BACKGROUND ART

An APN (All Photonics Network) enables construction of high-speed networks by processing all network transfer functions in the optical domain. To realize such APNs, a technique for high-speed interconnection of a plurality of networks for different services is required. For this reason, devices having functions for respective services are separately accommodated and implemented in stations of telecommunication carriers. In addition, it is particularly difficult to accommodate a point-to-point communication network and a mobile communication network in the same network, since these networks have been laid out independently of each other (NPLs 1 and 2).

CITATION LIST

Non Patent Literature

[NPL 1] "5G Wireless Access Network Standardization Trend", NTT Docomo Technical Journal Vol. 25, No. 3 Oct. 2017 (published October 2017)

[NPL 2] "Technical Report of Optical Access Technologies Applying 5G Mobile Fronthaul", TTC Technical Report TR-1079

SUMMARY OF THE INVENTION

Technical Problem

When a plurality of different services are accommodated in an optical network, different types of main signal processing are required for respective services to meet requirements of different transmission methods and functional deployments for the respective service. To realize such a variety of main signal processing, it is necessary to prepare a plurality of dedicated optical networks for the respective services, each network being constituted by a dedicated LSI (Large Scale Integration) for each service requirement, a transmission device equipped with the dedicated LSI, and so on. This requires huge capital investment, operational costs, and cumbersome management. In addition, there is a problem in that LSIs need to be produced again when service requirements are changed.

In view of the foregoing circumstances, an object of the present invention is to provide a technique that enables a plurality of different services to be accommodated in an optical network without preparing dedicated hardware for each service.

Means for Solving the Problem

One aspect of the present invention is a optical main signal processing node apparatus including: an input port configured to input an optical multiplexed with signals pertaining to a plurality of services from an optical transmission path; an output port configured to output an optical signal multiplexed with signals pertaining to a plurality of services to an optical transmission path; a optical main signal processer configured to perform optical main signal processing on an optical signal input from the input port; and a path switch configured to switch a path of the optical signal input from the input port to one of a first path for guiding the optical signal to the output port and a second path for guiding the optical signal to the optical main signal processer.

One aspect of the present invention is a control method of optical main signal processing node apparatus that includes: an input port for inputting an optical signal multiplexed with signals pertaining to a plurality of services from an optical transmission path; an output port for outputting an optical signal multiplexed with signals pertaining to a plurality of services to an optical transmission path; and a optical main signal processer configured to perform optical main signal processing on an optical signal input from the input port, the control method including: inputting the optical signal from the input port, with use of the optical main signal processing node device; and setting a path of the optical signal input from the input port to one of a first path for guiding the optical signal to the output port and a second path for guiding the optical signal to the optical main signal processer, with use of the optical main signal processing node apparatus.

Effects of the Invention

The present invention enables a plurality of different services to be accommodated in an optical network without preparing dedicated hardware for each service.

BRIEF DESCRIPTION OF DRAWINGS

FIG. 3 shows a specific example of a main optical signal processing table 150 in the main optical signal processing node 10 according to the first embodiment.

FIG. 6 shows an example of a main optical signal processing table 250 in the main optical signal processing node according to the second embodiment.

DESCRIPTION OF EMBODIMENTS

Hereinafter, embodiments of the present invention will be described with reference to the drawings.

First Embodiment

Figure 1:
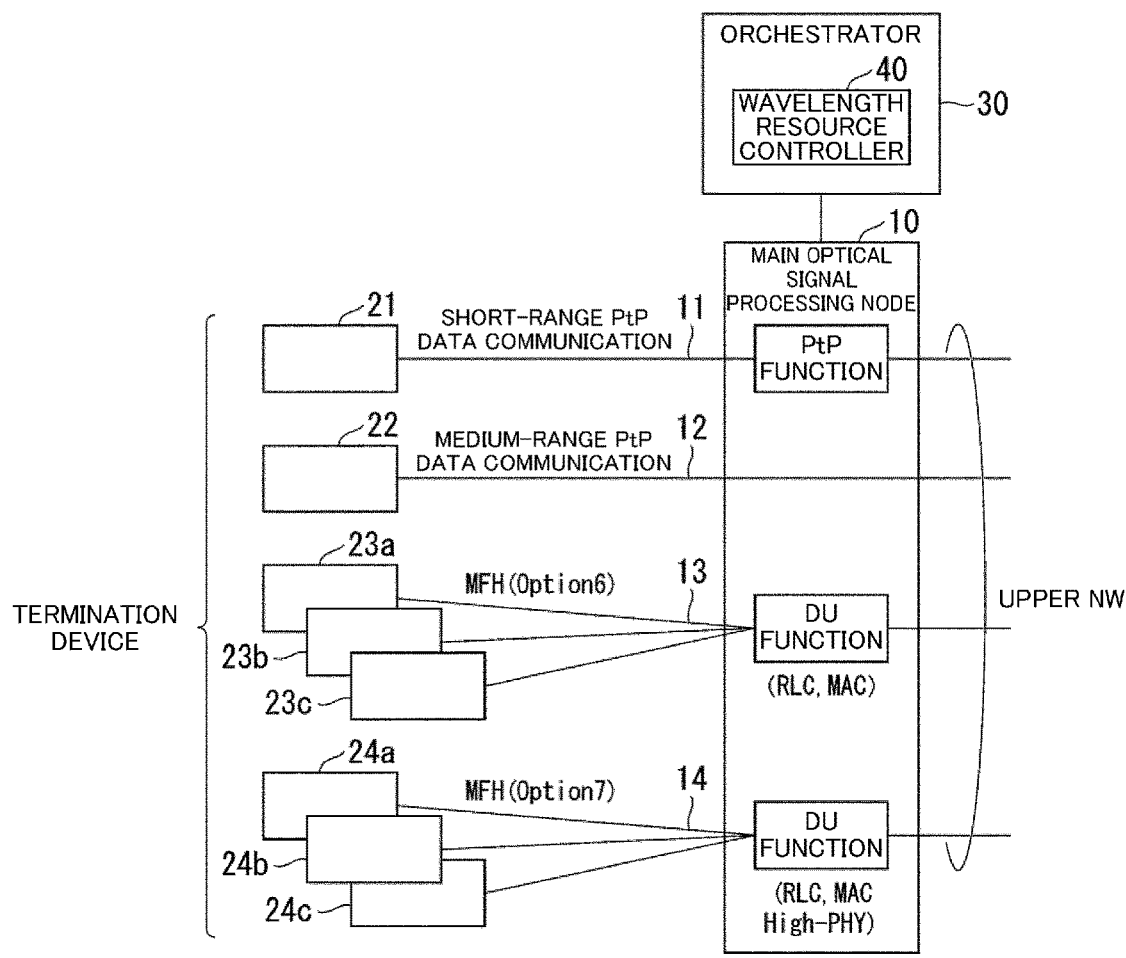
FIG. 1 is a block diagram showing an overall configuration of a system according an embodiment.

FIG. 1 is a block diagram showing an overall configuration of a system according the embodiment. In FIG. 1, a main optical signal processing node (optical main signal processing node apparatus) 10 functions as a photonic gateway that interconnects a plurality of networks for different services. The networks included in the present embodiment include PtP (Point To Point) data communication, PtMP (Point to Multipoint) data communication, MFH (Mobile Fronthaul), and so on. MFH is a network portion that connects a plurality of RRHs (Remote Radio Heads) to a BBU (Base Band Unit) that performs baseband processing.

In the example shown in FIG. 1, the main optical signal processing node 10 has a network 11 for performing short-range PtP data communication, a network 12 for performing medium-range PtP data communication, a network 13 for performing MFH (which will also called MFH 1) communication of Option 6, and a network 14 for performing MFH (which will also called MFH 2) communication of Option 7. Termination devices 21 and 22 are ONUs (Optical Network Units), for example. Termination devices 23a, 23b, 23c, 24a, 24b, and 24c are RRHs (Remote Radio Heads), for example. An upper network for short-range PtP data communication and medium-range PtP data communication is an OLT (Optical Line Terminal), for example. An upper network of a mobile network is a BBU (Base Band Unit), for example. Note that these networks are examples, and the present invention can include various other networks.

A wavelength multiplexing technique is introduced in the system according to the first embodiment, where different wavelengths are allocated to respective services. An orchestrator 30 performs control processing related to the services and the entire network. A wavelength resource controller 40 manages wavelength resources of networks under the control of the main optical signal processing node 10, and performs control management of wavelength allocation to the services, the transmission method for each wavelength, and the like.

In the main optical signal processing node 10 according to the first embodiment, different main signal processing functions can be added for each wavelength or for every two or more wavelengths. For example, for MFH services, signal processing for various DU (Distributed Unit) functions is required. That is, MFH services require processing for DU functions such as RLC (Radio Link Control) and MAC (Medium Access Control) processing, including radio resource allocation and retransmission control. The main optical signal processing node 10 adds a DU function to a wavelength used in an MFH network, for example. In addition, the main optical signal processing node 10 allocates a wavelength for each service, and adds main signal processing required for the service to this wavelength.

Figure 2:
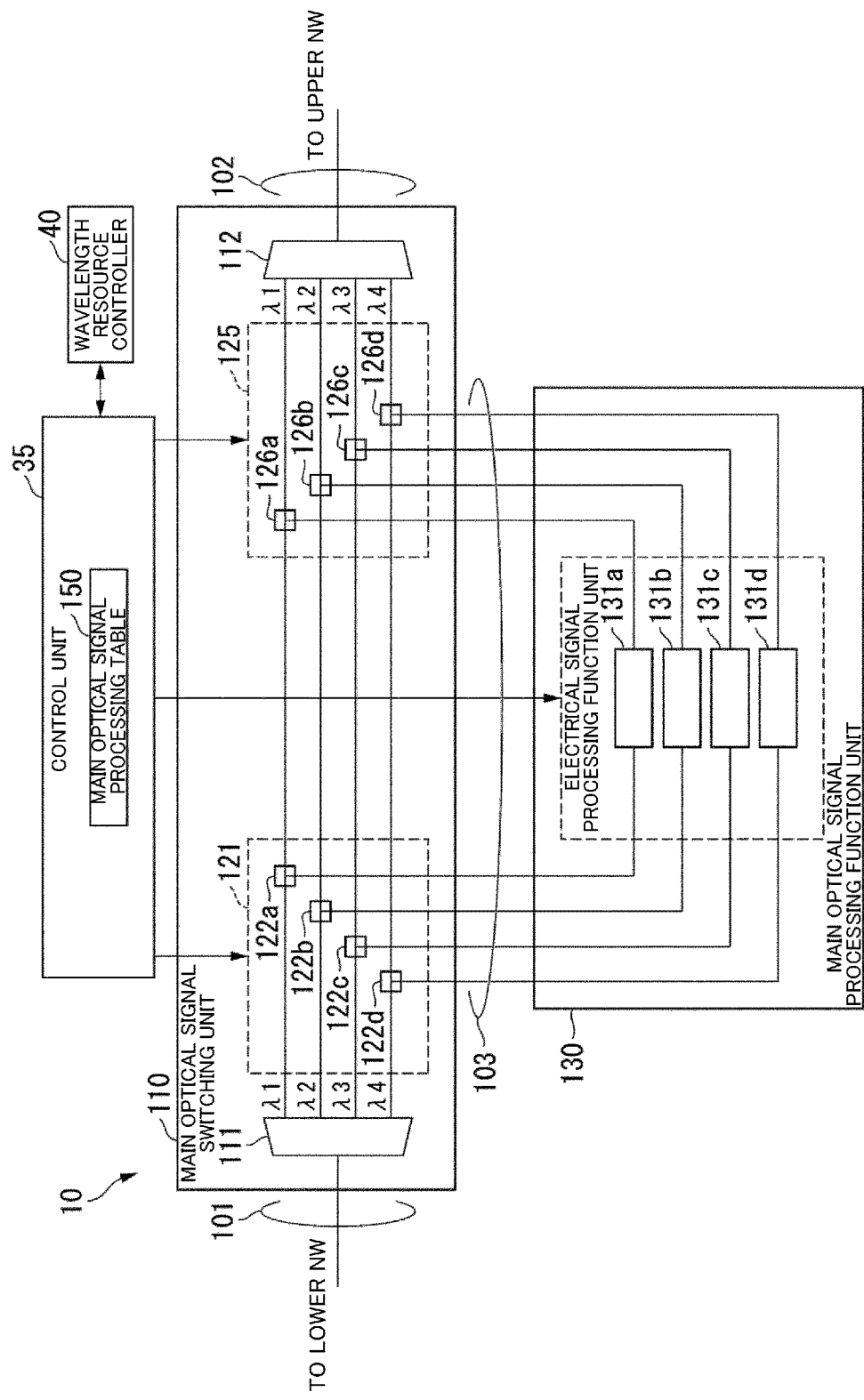
FIG. 2 is a block diagram showing a configuration of a main optical signal processing node 10 according to a first embodiment.

FIG. 2 is a block diagram showing a configuration of the main optical signal processing node 10 according to the first embodiment. In this example, four wavelengths λ1, λ2, λ3, and λ4 are multiplexed, but the number of wavelengths is not limited thereto. Further, in this example, bidirectional communication from a lower network to an upper network or from the upper network to the lower network is performed using a corresponding wavelength. However, bidirectional communication may be realized in any manner. Different wavelengths may be used for communication from the lower network to the upper network and from an upper network to a lower network.

As shown in FIG. 2, the main optical signal processing node 10 according to the present embodiment has a port 101, a port 102, and a port 103. The port 101 is a connection port to the lower network. An optical transmission path leading to the lower network is connected to the port 101. The port 102 is a connection port to the upper network. An optical transmission path leading to the upper network is connected to the port 102. The port 103 is a port that guides optical signals to a main optical signal processing function unit 130 for each wavelength. The main optical signal processing function unit (optical main signal processor) 130 realizes independent main signal processing for each wavelength.

A main optical signal switching unit (path switch) 110 is a part of a photonic gateway and switches optical signals for each wavelength. The main optical signal switching unit 110 includes wavelength multiplexer-demultiplexers 111 and 112 and path switching units 121 and 125.

The wavelength multiplexer-demultiplexer 111 divides a wavelength-multiplexed optical signal input from the port 101 into optical signals with respective wavelengths. The port 101 inputs an optical signal from the optical transmission path. The wavelength multiplexer-demultiplexer 111 also multiplexes optical signals with respective wavelengths and outputs the multiplexed optical signal from the port 101. The port 101 outputs an optical signal to the optical transmission path. The wavelength multiplexer-demultiplexer 112 divides a wavelength-multiplexed optical signal input from the port 102 into optical signals with respective wavelengths. The wavelength multiplexer-demultiplexer 112 also multiplexes optical signals with respective wavelengths and outputs the multiplexed optical signal from the port 101. As far as the function of the system of this embodiment is concerned, the wavelength multiplexer-demultiplexers 111 and 112 are not necessary.

The path switching unit 121 has optical switches 122a to 122d that switch the path of optical signals on the port 101 side between a path toward the port 102 and a path toward the port 103 for each wavelength. The path switching unit 125 also has optical switches 126a to 126d that switch the path of optical signals on the port 102 side between a path toward the port 101 and a path toward the port 103 for each wavelength. As mentioned above, the port 103 is a port that guides optical signals to the main optical signal processing function unit 130 for each wavelength.

The main optical signal processing function unit 130 has electrical signal processing function units 131a to 131d for performing main signal processing for each service. The electrical signal processing function units 131a to 131d include functions of converting optical signal to electrical signals (O/E (Optical/Electrical) conversion) and converting electrical signals to optical signals (E/O (Electrical/Optical) conversion). In general, the series of processes of converting optical signals to electrical signals, performing electrical signal processing, and then converting the electrical signals to optical signals leads to an increase in delay time and even a decrease in service quality. It is, therefore, desirable that the main optical signal processing function unit 130 is configured to perform minimum electrical signal processing.

A main optical signal processing table 150 is a table that indicates the correspondence relationship between wavelengths, services, path settings, and main signal processing. The main optical signal processing table 150 is created and updated by the wavelength resource controller 40 and a control unit 35 exchanging wavelength control signals.

FIG. 3 shows a specific example of the main optical signal processing table 150 in the main optical signal processing node 10 according to the first embodiment. In this example, the wavelength λ1 is allocated to PtP data communication. The wavelength λ2 is allocated to MFH data communication of Option 6. The wavelength λ3 is allocated to MFH data communication of Option 7. The wavelength λ4 is not used.

For the wavelength λ1, the path setting is set to "through". When the path setting is "through", the optical switch 122*a* is set toward the port 102, and the optical switch 126*a* is set toward the port 101. Further, for the wavelength λ1, the main signal processing function is NA (Not Applicable). In this case, since the wavelength λ1 is not input to the main optical signal function unit 130, the electrical signal processing function unit 131*a* for the wavelength λ1 does not any special processing.

For the wavelength λ2, the path setting is set to "switch". When the path setting is "switch", the optical switch 122*b* is set toward the port 103, and the optical switch 126*b* is set toward the port 103. Further, for the wavelength λ2, the main signal processing function is the DU function of Option 6. In this case, the electrical signal processing function unit 131*b* for the wavelength λ2 performs processing for the DU function of Option 6.

For the wavelength λ3, the path setting is set to "switch". When the path setting is "switch", the optical switch 122*c* is set toward the port 103, and the optical switch 126*c* is set toward the port 103. Further, for the wavelength λ3, the main signal processing function is the DU function of Option 7. In this case, the electrical signal processing function unit 131*c* for the wavelength λ3 performs processing for the DU function of Option 7.

For the wavelength λ4, the path setting is set to "switch". When the path setting is "switch", the optical switch 122*d* is set toward the port 103, and the optical switch 126*d* is set toward the port 103. In addition, for the wavelength λ4, the main signal processing function is frame discarding. In this case, the electrical signal processing function unit 131*d* for the wavelength λ4 discards or buffers signals.

Figure 4:
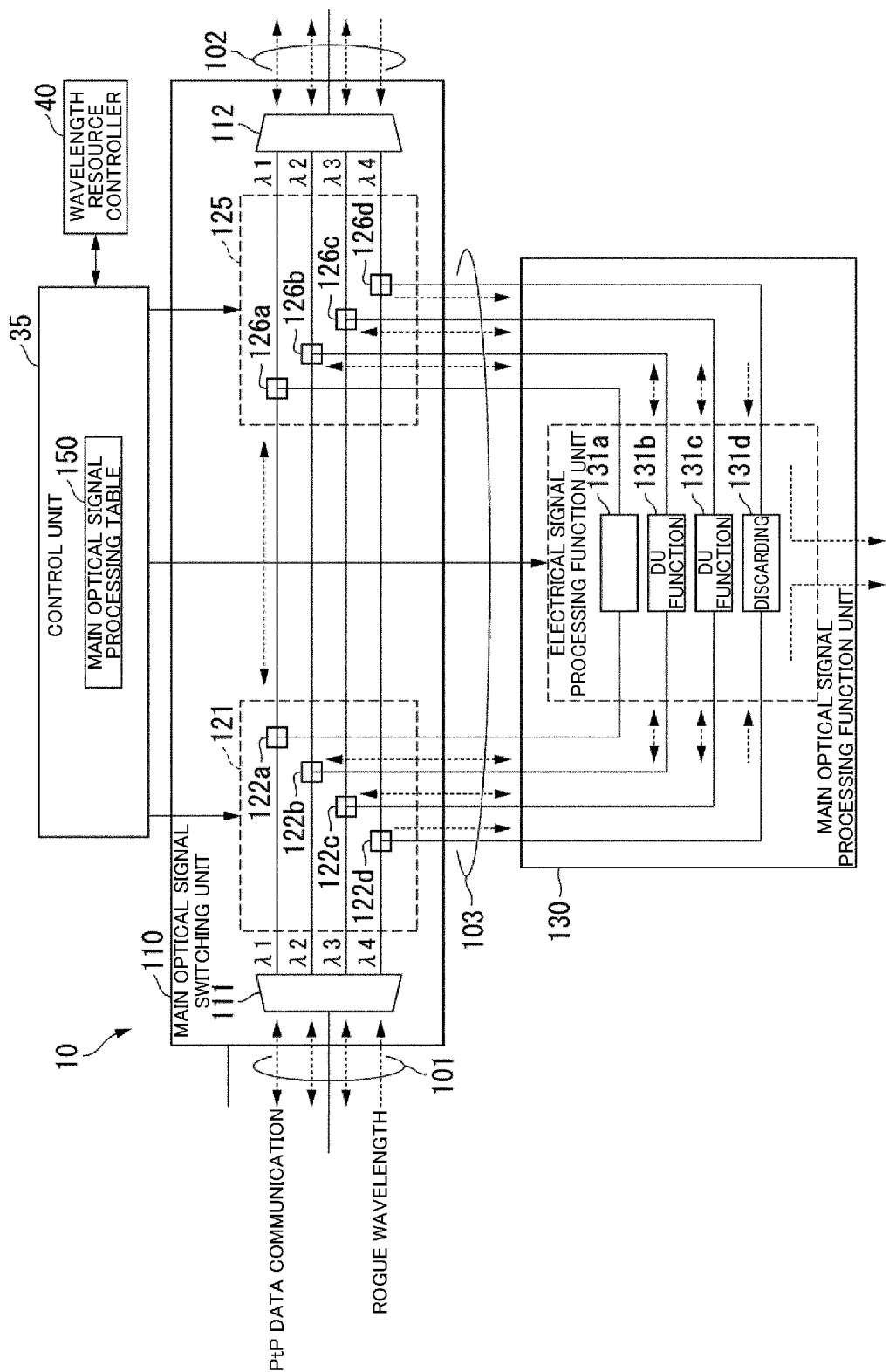
FIG. 4 illustrates flows of optical signals in a system according to the first embodiment.

FIG. 4 illustrates flows of optical signals in the system according to the first embodiment. In the case of the above-described main optical signal processing table 150, optical signals with the respective wavelengths are processed as follows.

Signals in PtP data communication are transmitted with the wavelength λ1. The service of PtP data communication does not require main signal processing. Signals in PtP data communication from the lower network to the upper network are input from the port 101 and output as-is from the port 102 via the optical switch 122*a* of the path switching unit 121 and the optical switch 126*a* of the path switching unit 125. Conversely, signals in PtP data communication from the upper network to the lower network are input from the port 102 and output as-is from the port 101 via the optical switch 126*a* of the path switching unit 125 and the optical switch 122*a* of the path switching unit 121.

MFH Communication of Option 6 is transmitted with the wavelength λ2. The MFH services require main signal processing for the DU function. MFH Signals from the lower network to the upper network are input from the port 101 and output from the port 102 via the optical switch 122*b* of the path switching unit 121, the electrical signal processing function unit 131*b* of the main optical signal processing function unit 130, and the optical switch 126*b* of the path switching unit 125. Conversely, MFH signals from the upper network to the lower network are input from the port 102 and output from the port 101 via the optical switch 126*b* of the path switching unit 125, the electrical signal processing function unit 131*b* of the main optical signal processing function unit 130, and the optical switch 122*b* of the path switching unit 121. Processing for the DU function required for MFH signals of Option 6 is performed by the electrical signal processing function unit 131*b*.

MFH Communication of Option 7 is transmitted with the wavelength λ3. The MFH services require main signal processing for the DU function. MFH Signals from the lower network to the upper network are input from the port 101 and output the port 102 via the optical switch 122*c* of the path switching unit 121, the electrical signal processing function unit 131*c* of the main optical signal processing function unit 130, and the optical switch 126*c* of the path switching unit 125. Conversely, MFH signals from the upper network to the lower network are input from the port 102 and output from the port 101 via the optical switch 126*c* of the path switching unit 125, the electrical signal processing function unit 131*c* of the main optical signal processing function unit 130, and the optical switch 122*c* of the path switching unit 121. Processing for the DU function required for MFH signals of Option 7 is performed by the electrical signal processing function unit 131*c*.

The wavelength λ4 is not used for transmission. Accordingly, there is originally no signal with the wavelength λ4. However, there are cases where the wavelength λ4 is transmitted due to the occurrence of a rogue wavelength (a wavelength that should not be originally used but is unintentionally transmitted due to an equipment failure, etc.). Such a rogue wavelength is recognized as an abnormal condition caused by the generation of a large amount of noise for a communication device or a controller and an orchestrator for control management, which leads to disconnection (link-down) of the entire communication system, including communication with normal wavelengths in some cases, resulting in service disconnection. As a result, a serious incident may occur. When there is noise with the wavelength λ4 caused by the induction of a rogue wavelength or the like in the lower network, this noise is sent from the port 101 to the optical switch 122*d* of the path switching unit 121 and the electrical signal processing function unit 131*d* of the main optical signal processing function unit 130. The electrical signal processing function unit 131*d* discards this noise. Accordingly, the noise with wavelength λ4 caused by the induction of a rogue wavelength or the like is not output from the port 102, and is therefore not output to the upper network. Also, when there is noise with the wavelength λ4 caused by the induction of a rogue wavelength or the like in the upper network, this noise is sent from the port 102 to the optical switch 126*d* of the path switching unit 125 and the electrical signal processing function unit 131*d* of the main optical signal processing function unit 130. The electrical signal processing function unit 131*d* discards this noise. Accordingly, the noise with wavelength λ4 caused by the induction of a rogue wavelength or the like is not output from the port 101, and is therefore not output to the lower network.

As described above, in the main optical signal processing node 10 according to the present embodiment, optical signals with wavelengths that do not require main signal processing, of the main signals input from an input-side port (port 101 or 102), are output as-is from an output-side port (port 102 or 101) via the path switching units 121 and 125. Optical signals with wavelengths that require main signal processing are transferred from an input-side port (port 101 or 102) to the main optical signal processing function unit 130 via an input-side path switching unit (path switching unit 121 or 125), processed by the electrical signal processing function units 131a to 131d of the main optical signal processing function unit 130, and then output from an output-side port (port 102 or 101) through an output-side path switching unit (path switching unit 125 or 121). This configuration allows the networks for different services to be accommodated in the same optical network without the need for a dedicated LSI.

In the main optical signal processing node 10 according to the present embodiment, when light with a wavelength that does not correspond to a service is input, the main optical signal processing functional unit 130 discards or buffers the frame. The effects of noise caused by the induction of a rogue wavelength or the like can thus be eliminated. Therefore, this configuration suppresses the effects of noise on the entire network, and has the effect of improving the reliability of the entire network. Furthermore, when light with a wavelength that does not correspond to a service is input, the main optical signal processing functional unit 130 discards or buffers the frame and notifies the control unit 35 that an undesignated wavelength has been input, so that a rogue wavelength can be discarded and detected.

All the optical switches 122a to 122d and 126a to 126d of the path switching units 121 and 125 can be set toward the port 103 by default so that noise components with unused wavelengths can be sent to the main optical signal processing function unit 130 and discarded. Accordingly, noise components with unused wavelengths, such as a rogue wavelength, can be prevented from being transmitted to the upper network or the lower network.

Second Embodiment

Next, the second embodiment will be described. In the second embodiment, the traffic of optical signals for the same service sent with different wavelengths is aggregated so that the number of wavelengths can be reduced. Note that the basic configuration is the same as the above-described first embodiment.

Figure 5:
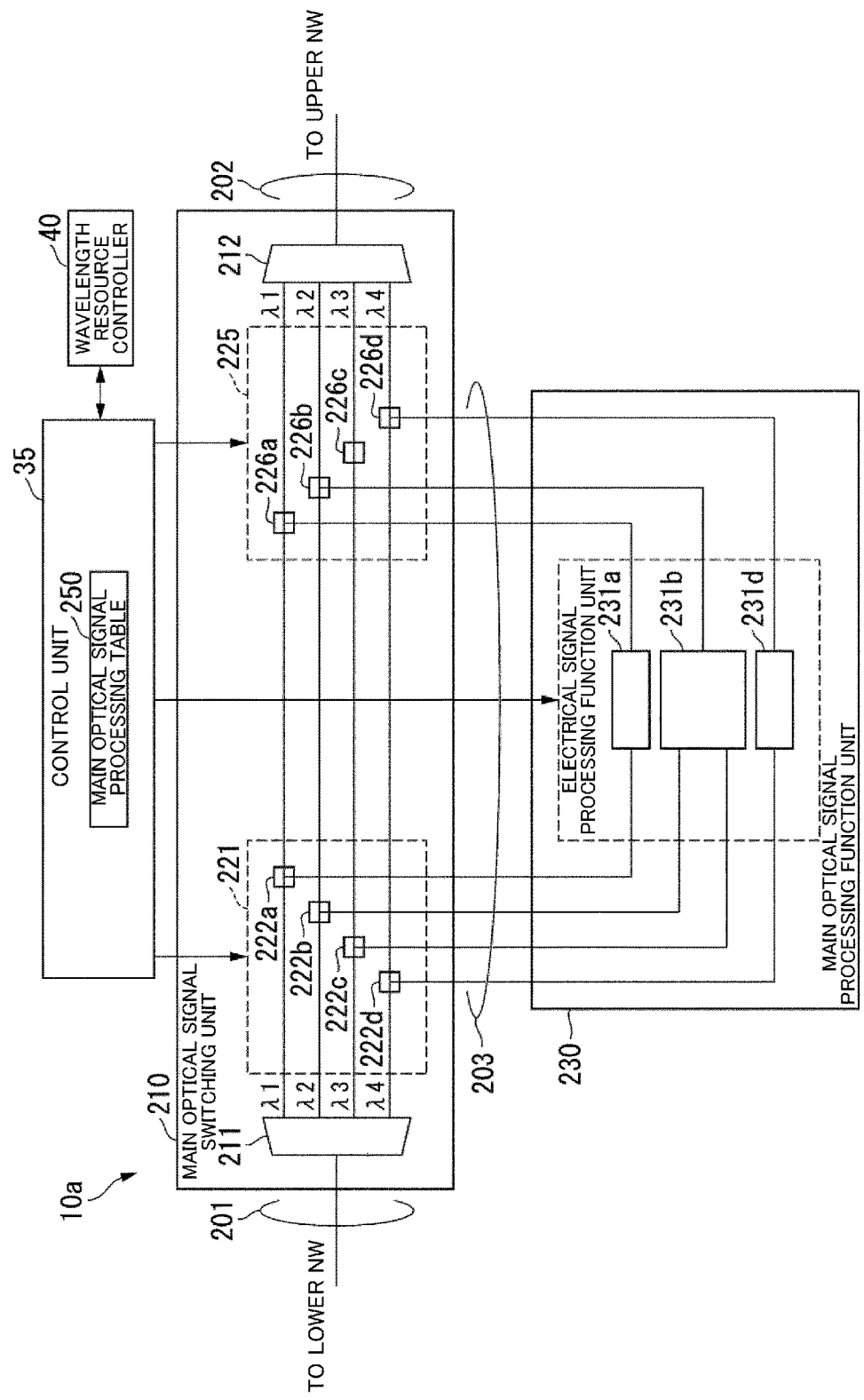
FIG. 5 is a block diagram showing a configuration of a main optical signal processing node 10a according to a second embodiment.

FIG. 5 is a block diagram showing a configuration of a main optical signal processing node 10a according to the second embodiment. In FIG. 5, ports 201 to 203 correspond to the ports 101 to 103 of the first embodiment. A main signal switching unit 210, wavelength multiplexer-demultiplexers 211 and 212, path switching units 221 and 225, optical switches 222a to 222d and 226a to 226d, a main optical signal processing function units 230, electrical signal processing function units 231a to 231d, and a main optical signal processing table 250 correspond respectively to the main optical signal switching unit 110, the wavelength multiplexer-demultiplexers 111 and 112, the path switching units 121 and 125, the optical switches 122a to 122d and 126a to 126d, the main optical signal processing function unit 130, the electrical signal processing function units 131a to 131c, and the main optical signal processing table 150 of the first embodiment.

In this embodiment, the electrical signal processing function unit 231b included in the main optical signal processing function unit 230 includes a function of aggregating optical signals for the same service transmitted with different wavelengths.

FIG. 6 shows an example of the main optical signal processing table 250 in the main optical signal processing node according to the second embodiment. In this example, the wavelength λ1 is allocated to PtP data communication. The wavelengths λ2 and λ3 are allocated to MFH data communication of Option 6. The wavelength λ4 is not used.

For the wavelength λ1, the path setting is set to "through". When the path setting is "through", the optical switch 222a is set toward the port 102 side, and the optical switch 226a is set toward the port 201. Further, for the wavelength λ1, the main signal processing function is NA (Not Applicable). In this case, since the wavelength λ1 is not input to the main optical signal function unit 130, the electrical signal processing function unit 231a for the wavelength λ1 does not any special processing.

For the wavelength λ2, the path setting is set to "switch". When the path setting is "switch", the optical switch 222b is set toward the port 203, and the optical switch 226b is set toward the port 203. Further, for the wavelength λ2, the main signal processing function includes the DU function of Option 6 and aggregation.

For the wavelength λ3, the path setting is set to "switch". When the path setting is "switch", the optical switch 222c is set toward the port 203, and the optical switch 226c is set toward the port 203. Further, for the wavelength λ3, the main signal processing function includes the DU function of Option 6 and aggregation, similarly to the wavelength λ2.

For the wavelength λ4, the path setting is set to "switch". When the path setting is "switch", the optical switch 222d of the path switching unit 221 is set toward the port 203, and the optical switch 226d of the path switching unit 225 is set toward the port 203. In addition, for the wavelength λ4, the main signal processing function is frame discarding.

Figure 7:
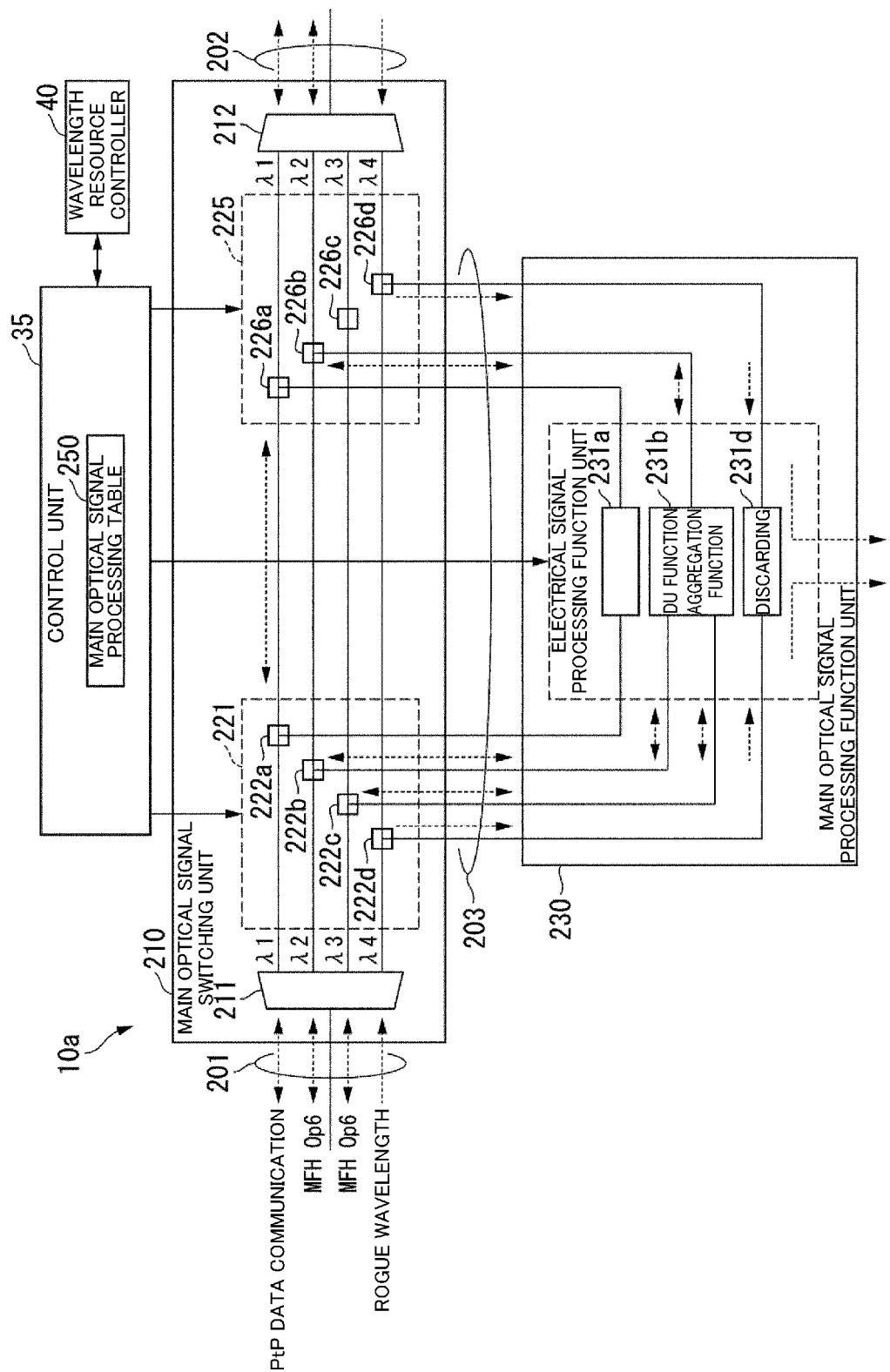
FIG. 7 illustrates flows of optical signals in a system according to the second embodiment.

FIG. 7 illustrates flows of optical signals in the system according to the second embodiment. In the case of the above-described main optical signal processing table 250, optical signals with the respective wavelengths are processed as follows.

Signals in PtP data communication are transmitted with the wavelength λ1. The service of PtP data communication does not require main signal processing. Signals in PtP data communication from the lower network to the upper network are input from the port 201 and output as-is from the port 202 via the optical switch 222a of the path switching unit 221 and the optical switch 226a of the path switching unit 225. Conversely, signals in PtP data communication from the upper network to the lower network are input from the port 202 and output as-is from the port 201 via the optical switch 226a of the path switching unit 225 and the optical switch 222a of the path switching unit 221.

MFH Communication of Option 6 is transmitted with the wavelengths λ2 and λ3. The MFH services require main signal processing for the DU function. MFH signals from the lower network to the upper network are sent from the port 201 to the electrical signal processing function unit 231b of the main optical signal processing function unit 230 via the optical switch 222b of the path switching unit 221. Similarly, MFH signals from the lower network to the upper network are sent from the port 201 to the electrical signal processing function unit 231b of the main optical signal processing function unit 230 via the optical switch 222c of the path switching unit 221. The electrical signal processing function unit 231b aggregates a signal with the wavelength λ2 and a signal with the wavelength λ3 into the traffic of a single wavelength λ2, and performs processing for the DU function required for MFH signals of Option 6. The optical signal aggregated into the wavelength λ2 is output from the port 102 via the optical switch 226b of the path switching unit 225. MFH signals from the upper network to the lower network are input from the port 102 and output from the port 201 via the optical switch 226b of the path switching unit 225, the electrical signal processing function unit 231b of the main optical signal processing function unit 230, and the optical switches 222b and 222c of the path switching unit 221.

The wavelength λ4 is not used for transmission. Accordingly, there is originally no signal with the wavelength λ4. However, there are cases where the wavelength λ4 is transmitted due to the occurrence of a rogue wavelength. Such a rogue wavelength is recognized as an abnormal condition caused by the generation of a large amount of noise for a communication device or a controller and an orchestrator for control management, which leads to disconnection (linkdown) of the entire communication system, including communication with normal wavelengths in some cases, resulting in service disconnection. As a result, a serious incident may occur. When there is noise with the wavelength λ4 caused by the induction of a rogue wavelength or the like in the lower network, this noise is sent from the port 201 to the optical switch 222d of the path switching unit 221 and the electrical signal processing function unit 231d of the main optical signal processing function unit 230. The electrical signal processing function unit 231d discards this noise with the wavelength λ4. Accordingly, the noise with wavelength λ4 caused by the induction of a rogue wavelength or the like is not output from the port 202, and is therefore not output to the upper network. When there is noise with the wavelength λ4, this noise is sent from the port 202 to the optical switch 226d of the path switching unit 225 and the electrical signal processing unit 231d of the main optical signal processing function unit 230. The electrical signal processing function unit 231d discards this noise with the wavelength λ4. Accordingly, the noise with wavelength λ4 caused by the induction of a rogue wavelength or the like is not output from the port 201, and is therefore not output to the upper network.

As described above, in the second embodiment, the electrical signal processing function unit 231b included in the main optical signal processing function unit 230 includes a function of aggregating optical signals of the same service transmitted with different wavelengths. This configuration enables the number of wavelengths required for the network to be reduced when the same service requirement is accommodated by different wavelengths. Note that in this example, the number of wavelengths of the upper network is reduced. However, the number of wavelengths of the lower network can also be reduced in the same manner.

Note that all the optical switches 122a to 122d and 126a to 126d of the path switching units 121 and 125 can be set toward the port 103 by default so that noise components with unused wavelengths can be sent to the main optical signal processing function unit 130 and discarded. Accordingly, noise components with unused wavelengths, such as a rogue wavelength, can be prevented from being transmitted to the upper network or the lower network.

The above-described control unit and electrical signal processing function units may each be constituted by a processor such as a CPU (Central Processing Unit), and a memory. That is, the control unit and the electrical signal processing function units may each function by a processor executing a program. Some or all of the functions of the control unit and the electrical signal processing function units may be realized by using hardware such as an ASIC (Application Specific Integrated Circuit), a PLD (Programmable Logic Device), or an FPGA (Field Programmable Gate Array). The aforementioned program may be recorded in a computer-readable recording medium. The computer-readable recording medium refers to, for example, a portable medium such as a flexible disk, a magneto-optical disk, a ROM, a CD-ROM, or a semiconductor storage device (e.g., SSD: Solid State Drive), or a storage device such as a hard disk or a semiconductor storage device built in a computer system. The aforementioned program may be transmitted over a telecommunication line.

Although the embodiments of this invention have been described above in detail with reference to the drawings, the specific configuration is not limited to these embodiments, and encompasses design or the like within the scope that does not deviate from the gist of this invention.

For example, although wavelength multiplexing is applied in the above description, the multiplexing technique used to accommodate a plurality of services need not necessarily be wavelength multiplexing. For example, a multiplexing technique such as subcarrier multiplexing or time division multiplexing may alternatively be applied.

INDUSTRIAL APPLICABILITY

The present invention is applicable to an optical network that accommodates a plurality of services.

REFERENCE SIGNS LIST 111, 112, 211, 212 Wavelength multiplexer-demultiplexer
121, 125, 221, 225 Path switching unit
130, 230 Main optical signal processing function unit
131a to 131d, 231a to 231c Electrical signal processing function unit

The invention claimed is:

1. An optical main signal processing node apparatus comprising:
   an input port configured to input an optical signal multiplexed with signals pertaining to a plurality of services from an optical transmission path;
   an output port configured to output the optical signal multiplexed with the signals pertaining to the plurality of services to the optical transmission path;
   an optical main signal processer configured to perform optical main signal processing on the optical signal input from the input port; and
   a path switch configured to switch a path of the optical signal input from the input port to one of a first path for guiding the optical signal to the output port and a second path for guiding the optical signal to the optical main signal processer,
   wherein the path switch is configured to guide each signal multiplexed with the optical signal to a predetermined path, and operate in response to a control of a controller configured to perform processing in accordance with content of an optical main signal processing table that stores pieces of information indicating paths for the respective signals multiplexed with the optical signal in association with each other.

2. An optical main signal processing node apparatus comprising:
   an input port configured to input an optical signal multiplexed with signals pertaining to a plurality of services from an optical transmission path;
   an output port configured to output the optical signal multiplexed with the signals pertaining to the plurality of services to the optical transmission path;
   an optical main signal processer configured to perform optical main signal processing on the optical signal input from the input port; and
   a path switch configured to switch a path of the optical signal input from the input port to one of a first path for guiding the optical signal to the output port and a
second path for guiding the optical signal to the optical
main signal processer, wherein the path switch is preset toward the second path, and the optical main signal processer discards is configured to
discard a signal with a wavelength that is not used.

* * * * *